United States Patent
Lee et al.

(10) Patent No.: US 11,258,122 B2
(45) Date of Patent: Feb. 22, 2022

(54) METAL-AIR BATTERY

(71) Applicant: Samsung Electronics Co., Ltd., Suwon-si (KR)

(72) Inventors: Heungchan Lee, Seongnam-si (KR); Sangbok Ma, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 191 days.

(21) Appl. No.: 16/544,981

(22) Filed: Aug. 20, 2019

(65) Prior Publication Data

US 2020/0091574 A1 Mar. 19, 2020

(30) Foreign Application Priority Data

Sep. 14, 2018 (KR) .................. 10-2018-0110461

(51) Int. Cl.
*H01M 12/08* (2006.01)
*H01M 4/86* (2006.01)
*H01M 4/36* (2006.01)
*H01M 6/18* (2006.01)
*H01M 4/38* (2006.01)
*H01M 50/431* (2021.01)

(52) U.S. Cl.
CPC .......... *H01M 12/08* (2013.01); *H01M 4/366* (2013.01); *H01M 4/382* (2013.01); *H01M 4/8657* (2013.01); *H01M 4/8673* (2013.01); *H01M 6/18* (2013.01); *H01M 50/431* (2021.01)

(58) Field of Classification Search
CPC ..... H01M 12/08; H01M 4/8673; H01M 4/366
See application file for complete search history.

(56) References Cited

U.S. PATENT DOCUMENTS

| | | |
|---|---|---|
| 7,282,295 B2 | 10/2007 | Visco et al. |
| 7,691,536 B2 | 4/2010 | Johnson |
| 7,767,345 B2 | 8/2010 | Imagawa et al. |
| 9,166,263 B2 | 10/2015 | Ma et al. |
| 9,178,254 B2 | 11/2015 | Lee et al. |
| 9,263,779 B2 | 2/2016 | Lee et al. |
| 9,680,191 B2 | 6/2017 | Lee et al. |
| 9,780,386 B2 | 10/2017 | Kwon et al. |
| 9,905,883 B2 | 2/2018 | Badding et al. |

(Continued)

FOREIGN PATENT DOCUMENTS

| | | |
|---|---|---|
| KR | 100125152 B1 | 10/1997 |
| KR | 100623476 B1 | 9/2006 |
| KR | 1020160142197 A | 12/2016 |

OTHER PUBLICATIONS

European Search Report for European Patent Application No. 19196653.0 dated Dec. 17, 2019.

*Primary Examiner* — Matthew J Merkling
(74) *Attorney, Agent, or Firm* — Cantor Colburn LLP

(57) ABSTRACT

A metal-air battery includes: an anode including a metal; a cathode spaced apart from the anode; and a separator between the anode and the cathode, wherein the cathode includes a first cathode layer including a first conductive material, and a second cathode layer disposed on the first cathode layer, the second cathode layer including a second conductive material, and wherein the first cathode layer provides a metal ion conduction path and the second cathode layer provides an electron transfer path.

23 Claims, 14 Drawing Sheets

(56) References Cited

U.S. PATENT DOCUMENTS

| | | |
|---|---|---|
| 9,911,957 B2 | 3/2018 | Choi et al. |
| 9,947,933 B2 | 4/2018 | Roev et al. |
| 10,008,753 B2 | 6/2018 | Kwon et al. |
| 2007/0231704 A1 | 10/2007 | Inda |
| 2008/0070087 A1 | 3/2008 | Johnson |
| 2011/0059355 A1 | 3/2011 | Zhang et al. |
| 2011/0121240 A1* | 5/2011 | Amine ................ H01M 4/0471 |
| | | 252/502 |
| 2011/0129739 A1 | 6/2011 | Nakanishi |
| 2011/0223494 A1 | 9/2011 | Feaver et al. |
| 2012/0077084 A1 | 3/2012 | Christensen et al. |
| 2012/0077095 A1 | 3/2012 | Roumi et al. |
| 2012/0115048 A1 | 5/2012 | Roev et al. |
| 2012/0276459 A1 | 11/2012 | Im et al. |
| 2013/0011750 A1 | 1/2013 | Kim et al. |
| 2013/0224609 A1 | 8/2013 | Lee et al. |
| 2014/0017576 A1* | 1/2014 | Kim .................... H01M 10/052 |
| | | 429/403 |
| 2016/0322685 A1 | 11/2016 | Choi |
| 2016/0359166 A1 | 12/2016 | Han et al. |
| 2018/0040898 A1 | 2/2018 | Lee et al. |
| 2018/0123116 A1 | 5/2018 | Lee et al. |
| 2020/0235430 A1* | 7/2020 | Su ..................... H01M 10/0565 |

\* cited by examiner

< COMPARATIVE EXAMPLE 1 >

< COMPARATIVE EXAMPLE 1 >

< COMPARATIVE EXAMPLE 2 >

< EXAMPLE >

METAL-AIR BATTERY

CROSS-REFERENCE TO RELATED APPLICATION

This application claims priority to and the benefit of Korean Patent Application No. 10-2018-0110461, filed on Sep. 14, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a secondary battery, and more particularly, to a metal-air battery.

2. Description of the Related Art

A metal-air battery includes a negative electrode capable of ion occlusion/emission and a positive electrode using oxygen from the air as an active material. Oxygen reduction and oxidation reactions occur in the positive electrode, metal oxidation and reduction reactions occur in the negative electrode, and the generated chemical energy is converted and extracted as electrical energy. For example, the metal-air battery absorbs oxygen in a discharge mode and emits oxygen in a charge mode. Thus, since the metal-air battery uses oxygen present in the air as a positive electrode active material, the energy density of the battery may be greatly improved. For example, the metal-air battery may have and energy density which is several times greater than a lithium ion battery.

The positive electrode may function as both an electron transfer path and an ion transfer path in the metal-air battery. As a result, the capacity and performance of the metal-air battery may be influenced by, for example, the material and configuration of the positive electrode (air electrode). Also, the chemical deterioration and deformation of the metal-air battery caused by the reaction products formed during charge and discharge may result in performance degradation and life shortening of the metal-air battery. Thus there remains a need for improved metal-air battery materials.

SUMMARY

Provided is a metal-air battery having excellent performance.

Additional aspects will be set forth in part in the description which follows and, in part, will be apparent from the description, or may be learned by practice of the presented embodiments.

According to an aspect of an embodiment, a metal-air battery includes: an anode including a metal; a cathode spaced apart from the anode; and a separator between the anode and the cathode, wherein the cathode includes a first cathode layer including a first conductive material, and a second cathode layer disposed on the first cathode layer and including a second conductive material, and wherein the first cathode layer provides a metal ion transfer path, and the second cathode layer provides an electron transfer path.

A cation conductivity of the first cathode layer may be greater than an electron conductivity of the first cathode layer, an electron conductivity of the second cathode layer may be greater than a cation conductivity of the second cathode layer, the electron conductivity of the second cathode layer may be greater than the electron conductivity of the first cathode layer, and the cation conductivity of the first cathode layer may be greater than the cation conductivity of the second cathode layer.

The metal-air battery may have an allowable overvoltage per current density represented by equation 1:

$$\eta/J = R_1 h + R_2 l \tag{1}$$

wherein $\eta$ is an allowable overvoltage, J is a current density, $R_1$ is an ion resistance of the first cathode layer, $R_2$ is an ion resistance of the second cathode layer, h is a thickness of the first cathode layer, and l is a thickness of the second cathode layer, and wherein $\eta$ is greater than 0 volt and less than or equal to about 1 volt, and J is greater than or equal to about 0.2 $mA/cm^2$ and less than or equal to about 10 $mA/cm^2$.

The cathode may include a pore-containing layer including a pore.

A porosity of the pore-containing layer may be less than or equal to about 90 volume percent (vol %).

A specific surface area of the pore-containing layer may be greater than or equal to about 10 square meters per gram ($m^2/g$).

The first conductive material and the second conductive material may include a lithium oxide, a sodium oxide, or a combination thereof.

The first conductive material may include lithium titanium oxide (LTO), lithium manganese oxide (LMO), lithium cobalt oxide (LCO), lithium manganese nickel oxide (LMNO), lithium nickel manganese cobalt oxide (NMC), lithium nickel oxide (LNO), lithium iron phosphate (LFP), lithium iron manganese phosphate (LFMP), lithium lanthanum titanium oxide (LLTO), lithium aluminum titanium phosphate (LATP), lithium zinc germanium oxide (LISICON), lithium phosphorus oxynitride (LiPON), or a combination thereof, and the second conductive material may include lithium titanium oxide, lithium manganese oxide (LMO), lithium cobalt oxide (LCO), lithium manganese nickel oxide (LMNO), lithium nickel manganese cobalt oxide (NMC), lithium nickel oxide (LNO), lithium iron phosphate (LFP), lithium iron manganese phosphate (LFMP), lithium lanthanum titanium oxide (LLTO), lithium aluminum titanium phosphate (LATP), a reduced material thereof, or a combination thereof.

The first conductive material and the second conductive material may independently include an inorganic material having a perovskite structure, an anti-perovskite structure, a layered structure, a spinel structure, a sodium (Na) super ionic conductor type structure, or a combination thereof.

The first conductive material and the second conductive material may each include an inorganic solid compound.

The cathode may include an organic electrolyte-free electrode.

The cathode may include an empty space configured to receive a reaction product produced by the electrochemical reaction, and the empty space may include an electrolyte-free region.

The metal-air battery may further include a gas diffusion layer disposed on a surface of the second cathode layer.

The separator may include a solid electrolyte.

According to an aspect of another embodiment, a metal-air battery includes: an anode including a metal; a cathode spaced apart from the anode; and a separator between the anode and the cathode, wherein the cathode includes a first cathode layer including a first conductive material and a second cathode layer disposed on the first cathode layer and including a second conductive material, wherein the first cathode layer provides a metal ion transfer path and the second cathode layer provides an electron transfer path.

An electron conductivity of the second cathode layer may be greater than a cation conductivity of the second cathode layer, a cation conductivity of the first cathode layer may be greater than electron conductivity of the first cathode layer, the electron conductivity of the second cathode layer may be greater than the electron conductivity of the first cathode layer, and the cation conductivity of the first cathode layer may be greater than the cation conductivity of the second cathode layer.

The cathode may include a pore-containing layer including a pore.

A porosity of the pore-containing layer may be less than or equal to about 90 vol %.

A specific surface area of the pore-containing layer may be greater than or equal to about 10 $m^2/g$.

The first conductive material and the second conductive material may independently include a lithium oxide, a sodium oxide, or a combination thereof.

The first conductive material comprises lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, lithium zinc germanium oxide, lithium phosphorus oxynitride, or a combination thereof, and the second conductive material comprises lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, a reduced material thereof, or a combination thereof.

The first compound conductive material and the second compound conductive material may independently include an inorganic material having aa perovskite structure, an anti-perovskite structure, a layered structure, a spinel structure, a sodium (Na) super ionic conductor (NASICON) type structure, or a combination thereof.

The first conductive material and the second conductive material may each include an inorganic solid compound.

The cathode may include an organic electrolyte-free electrode.

The cathode may include an empty space configured to receive a reaction product produced by the electrochemical reaction, and the empty space may include an electrolyte-free region.

The metal-air battery may further include a gas diffusion layer disposed on a surface of the first cathode layer.

The separator may include a solid electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
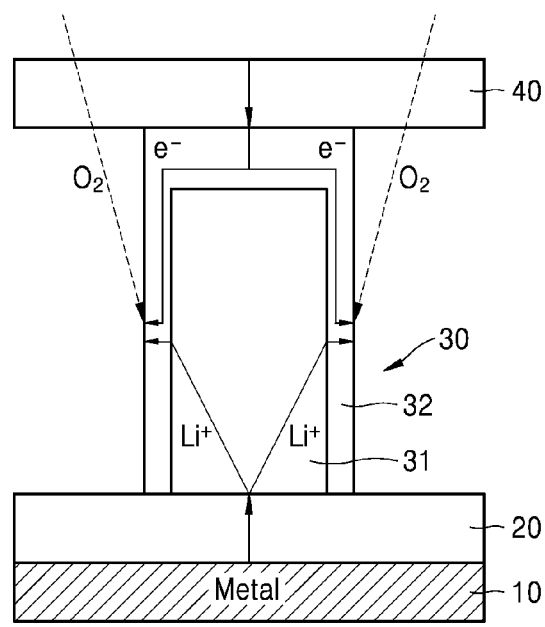
FIG. 1 is a cross-sectional view schematically illustrating an embodiment of a metal-air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Like reference numerals refer to like elements throughout.

It will be understood that when an element or layer is referred to as being "on" or "above" another element or layer, the element or layer may be directly on another element or layer or intervening elements or layers. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal-air battery will be described in detail with reference to the accompanying drawings. The width and/or thickness of a layer or a region illustrated in the accompanying drawings may be exaggerated for clarity and convenience of description.

FIG. 1 is a cross-sectional view schematically illustrating a metal-air battery according to an embodiment.

Referring to FIG. 1, the metal-air battery may include an anode (anode layer) 10 including a metal and a cathode (cathode layer) 30 spaced apart from the anode 10. The cathode 30 may include a first cathode layer 31 and a second cathode layer 32 disposed on, e.g., surrounding, a portion of the first cathode layer 31, e.g, a portion of the first cathode layer 31. The first cathode layer may be configured as a core structure within the second cathode layer disposed on a surface of the first cathode layer 31. A separator 20 may be disposed between the anode 10 and the cathode 30. The metal-air battery may further include a gas diffusion layer 40 in contact with a surface of the cathode 30. The gas diffusion layer 40 may facilitate the flow of oxygen ($O_2$) to the cathode 30. The cathode 30 may include a "cathode catalyst layer" and may be simply referred to as "cathode." The cathode 30 and the gas diffusion layer 40 together may constitute a "cathode portion." In an embodiment, the cathode portion of the metal-air battery may include the cathode 30 and, optionally, may further include the gas diffusion layer 40.

The anode 10 may include a metal capable of occluding, e.g., plating or absorbing, and emitting, e.g., desorbing, metal ions. The metal may include, for example, lithium (Li), sodium (Na), zinc (Zn), potassium (K), calcium (Ca), magnesium (Mg), iron (Fe), aluminum (Al), an alloy thereof, or a combination thereof. For example, the anode 10 may comprise lithium (Li), e.g., lithium or a lithium-based alloy, and optionally a lithium intercalation compound. When the anode 10 includes lithium, the metal-air battery may be referred to as a "lithium-air battery".

The cathode 30 may be an air electrode, which uses oxygen ($O_2$) in the air as an active material. In a metal-air battery, during the electrochemical reaction between the metal ions provided from the anode 10 and the gas (e.g., oxygen) provided to the cathode 30, the first cathode layer 31 may facilitate the flow of metal ions by providing a metal ion path and the second cathode layer 32 may facilitate the flow of electrons by providing an electron transfer path. However, in the present disclosure, the first cathode layer 31 is not limited to the provision of a metal ion path and the second cathode layer 32 is not limited to the provision of an electron transfer path. For example, a metal ion conductivity of the first cathode layer 31 may be greater than a metal ion conductivity of the second cathode layer 32, and an electron conductivity of the second cathode layer 32 may be greater than an electron conductivity of the first cathode layer 31. As an example, a portion of the first cathode layer 31 on which the second cathode layer 32 is not disposed, may be in contact with the separator 20, and the gas diffusion layer 40 may be disposed on a surface of the second cathode layer 32.

When the metal-air battery is a lithium-air battery, the following electrochemical reaction may occur in the cathode during discharge.

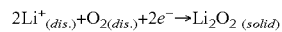

$$2Li^+_{(dis.)} + O_{2(dis.)} + 2e^- \rightarrow Li_2O_{2\,(solid)}$$

As shown in the above electrochemical reaction, during discharge, lithium ions ($Li^+$) provided by the anode 10 and oxygen ($O_2$) provided from the atmosphere (air), react with electrons ($e^-$) on the surface of the cathode 30 to produce solid $Li_2O_2$. In this case, the cathode 30 may provide both the transfer path for the lithium ions ($Li^+$) and the transfer path for the electrons ($e^-$). Herein, the $Li_2O_2$ may be an example of a reaction product. The discharge reaction may be reversed during charge of the metal-air battery.

As described above, the first cathode layer 31 may provide a path for the flow of metal ions ($Li^+$), the second cathode layer 32 may provide a transfer path for the electrons ($e^-$). To facilitate the formation of the paths for metal ion and electron flow, the first cathode layer 31 and the second cathode layer 32 may include a first conductive material and a second conductive material, respectively, which are capable of both electron conduction and ion conduction.

The first conductive material included in the first cathode layer 31 may have a first cation conductivity $\delta_{ion1}$ which is greater than a first electron conductivity $\delta_{e1}$ thereof. The second conductive material included in the second cathode layer 32 may have a second electron conductivity $\delta_{e2}$ which is greater than a second cation conductivity $\delta_{ion2}$ thereof. The cation conductivity (e.g., cation diffusivity) ($\delta_{ion}$) and the electron conductivity ($\delta_e$) may be compared with each other using the same unit of measurement. Also, the first cation conductivity $\delta_{ion1}$ of the first conductive material may be greater than the second cation conductivity $\delta_{ion2}$ of the second conductive material, and the second electron conductivity $\delta_{e2}$ of the second conductive material may be greater than the first electron conductivity $\delta_{e1}$ of the first conductive material. As described above, since the first cathode layer 31 includes the first conductive material having the first cation conductivity $\delta_{ion1}$ which is greater than the first electron conductivity $\delta_{e1}$, the first cathode layer 31 may facilitate formation of the metal ion transfer path. Also, since the second cathode layer 32 includes the second conductive material having the second electron conductivity $\delta_{e2}$ which is greater than the second cation conductivity $\delta_{ion2}$, the second cathode layer 32 may facilitate formation of the electron transfer path.

The cation conductivity and electron conductivity of the first and second compound conductive materials may be selected by varying the composition ratio or dopant of the first and/or second conductive material. Even in the case where the materials of a given composition are the same, the cation conductivity and the electron conductivity may vary depending on the composition ratio or the dopant. The first conductive material and the second conductive material may independently include, for example, a lithium-based oxide, a sodium-based oxide, or a combination thereof.

As a particular example, the first conductive material may include lithium manganese oxide (LMO), lithium cobalt oxide (LCO), lithium manganese nickel oxide (LMNO), lithium nickel manganese cobalt oxide (NMC), lithium nickel oxide (LNO), lithium iron phosphate (LFP), lithium iron manganese phosphate (LFMP), lithium lanthanum titanium oxide (LLTO), lithium aluminum titanium phosphate (LATP), lithium zinc germanium oxide (LISICON), lithium phosphorus oxynitride (LiPON), or a combination thereof. The ion conduction and electron conduction characteristics of the first conductive material may be suitably controlled by selecting the composition ratio or the dopant of the above materials. However, the above-listed materials are merely examples, and other materials may also be used as the first conductive material. Also, the first compound conductive material may have a Perovskite structure, an anti-perovskite structure, a layered structure, a spinel structure, a sodium (Na) super ionic conductor (NASICON) type structure. The first conductive material may include an inorganic-based solid compound including a metal element. Also, the first conductive material may include a non-carbon-based material.

Also, the second conductive material may include lithium titanium oxide (LTO), lithium manganese oxide (LMO), lithium cobalt oxide (LCO), lithium manganese nickel oxide (LMNO), lithium nickel manganese cobalt oxide (NMC), lithium nickel oxide (LNO), lithium iron phosphate (LFP), lithium iron manganese phosphate (LFMP), lithium lanthanum titanium oxide (LLTO), lithium aluminum titanium phosphate (LATP), a reduced material thereof, or a combination thereof. The ion conduction and electron conduction characteristics of the second conductive material may be suitably controlled by selecting the composition ratio or the dopant of the above materials. However, the above-listed materials are merely examples, and other materials may also be used as the second conductive material. Also, the second conductive material may have a perovskite structure, an anti-perovskite structure, a layered structure, a spinel structure, a NASICON type structure, or a combination thereof. The second conductive material may include an inorganic-based solid compound including a metal element. Also, the second conductive material may include a non-carbon-based material.

The first conductive material included in the first cathode layer 31 and the second conductive material included in the second cathode layer 32 may each independently include an inorganic-based solid compound. Thus, the cathode 30 may be an electrode which does not include an organic-based electrolyte, that is, an organic electrolyte-free electrode. Also, the cathode 30 may be an electrode which does not include a liquid electrolyte, that is, a liquid electrolyte-free electrode.

The separator 20 may include an ion conductive material to allow ion conduction (flow) between the anode 10 and the cathode 30. The separator 20 may include a solid electrolyte. The electrolyte of the separator 20 may be a solid phase electrolyte including a polymer-based electrolyte, an inorganic-based electrolyte, or a combination thereof. For example, the separator 20 may include a polymeric nonwoven fabric, such as, for example, a nonwoven fabric of polypropylene, a nonwoven fabric of polyphenylene sulfide, a porous film including an olefin-based resin such as polyethylene or polypropylene, or a combination thereof. However, these solid electrolyte materials are merely examples and may vary according to various embodiments.

The gas diffusion layer 40 may absorb oxygen, e.g., oxygen present in the atmosphere, and provide the same to the cathode 30. For this purpose, the gas diffusion layer 40 may have a porous structure to facilitate diffusion of the oxygen without a significant concentration gradient. For example, the gas diffusion layer 40 may be include a carbon fiber-based carbon paper, a carbon cloth, a carbon felt, a sponge-like foamed metal, a metal fiber mat, or a combination thereof. Also, the gas diffusion layer 40 may include a flexible porous material such as a non-conductive, nonwoven fabric. Alternatively, the cathode 30 may have a porous structure or a similar structure to perform a role of a gas diffusion layer. In this case, the gas diffusion layer 40 may be omitted.

Although not illustrated in FIG. 1, the metal-air battery may further include an anode current collector disposed on and in electrical contact with the anode 10. The anode current collector may be disposed under the anode 10. Thus, the anode 10 may be disposed between the anode current collector and the separator 20. The anode current collector may include an electrically conductive material, for example, stainless steel (SUS), but is not limited thereto. Also, a cathode current collector disposed on the gas diffusion layer 40 may also be provided. The cathode current collector may be disposed on the gas diffusion layer 40, such that the gas diffusion layer 40 may be between the cathode current collector and the cathode 30. The cathode current collector may include an electrically conductive material, for example, stainless steel (SUS). In this case, the cathode current collector may have a mesh structure to facilitate air (gas) permeation. The material of the cathode current collector is not limited to SUS and other suitable materials may also be used. When the gas diffusion layer 40 is not present, the cathode current collector may directly contact the cathode 30. The anode current collector may be regarded as a part of the anode portion and similarly, the cathode current collector may be regarded as a part of the cathode portion.

The metal-air battery according to an embodiment may be a liquid electrolyte-free battery that does not include a liquid electrolyte. Also, the metal-air battery according to an embodiment may be an organic electrolyte-free battery that does not include an organic electrolyte. As such, the metal-air battery may be an organic electrolyte-free and/or liquid electrolyte-free battery and may have various features and advantages in this regard. These advantages will be described below in further detail.

Figure 2:
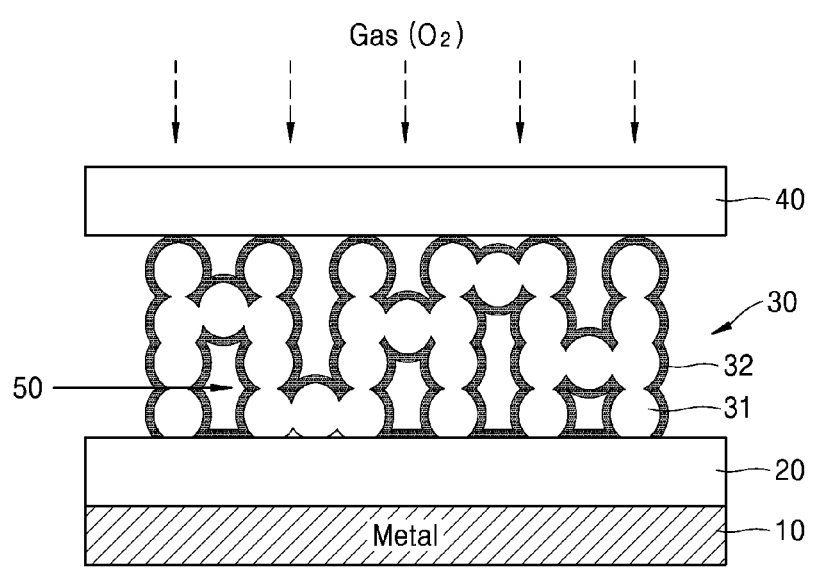
FIG. 2 is a cross-sectional view illustrating an embodiment of a metal-air battery.
Figure 3A:
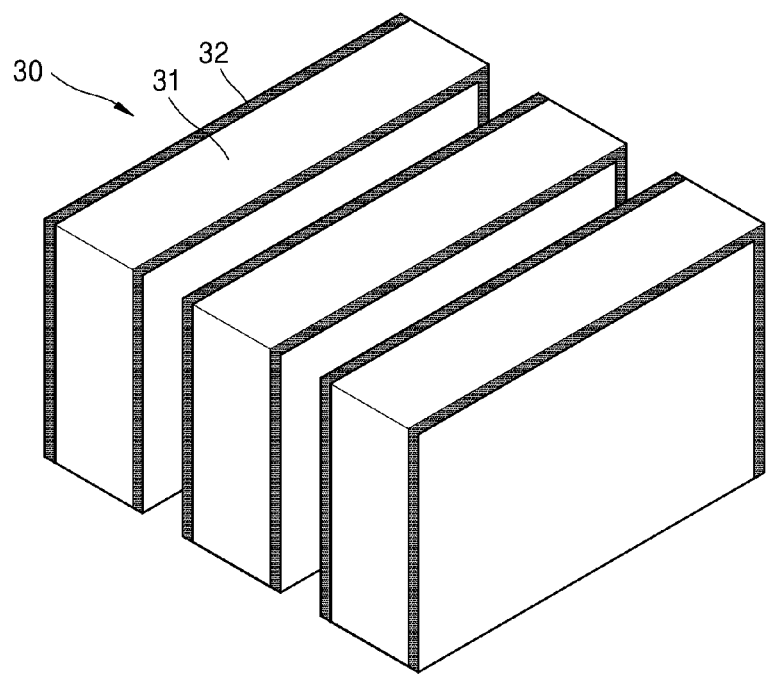
FIGS. 3A to 3C are perspective views schematically illustrating an embodiment of a cathode portion.
Figure 3B:
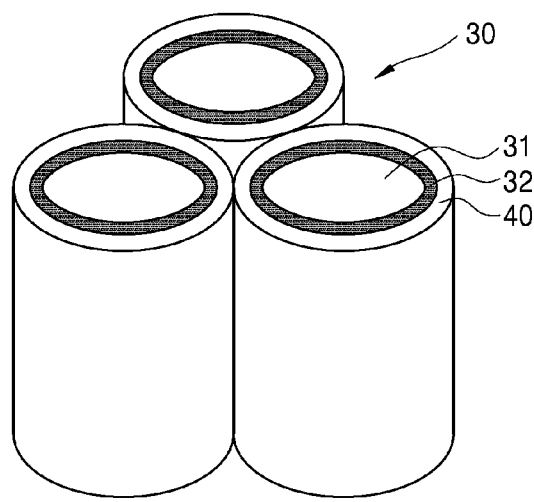
Figure 3C:
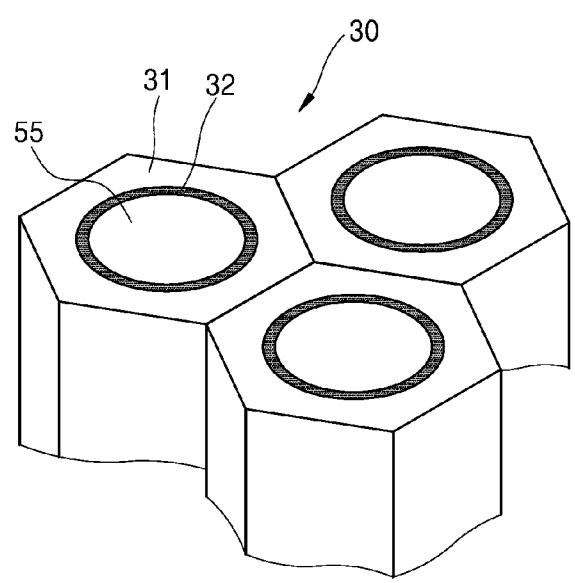

FIG. 2 is a cross-sectional view illustrating a metal-air battery according to an embodiment. FIGS. 3A to 3C are perspective views schematically illustrating a cathode portion of a metal-air battery, according to another embodiment.

Referring to FIG. 2, a cathode 30 may be configured to include an empty space 50 (e.g, an air gap or pore). A reaction product produced by an electrochemical reaction may be formed within the empty space. As such, during an electrochemical reaction, the empty spaces are configured so as to receive the reaction product. Thus, the cathode 30 may be referred to as "pore-containing layer" including a pore (e.g., an air gap, empty space, or void). In an embodiment, the pore-containing layer includes a plurality of pores disposed in a random manner therein. The pores may be an electrolyte-free region (i.e., containing no electrolyte) or only a portion of the pores may contain an electrolyte. In the present embodiment, since the cathode 30 may include a first cathode layer 31 capable of providing a path for metal ions (Li$^+$) and a second cathode layer 32 capable of providing a transfer path for electrons (e$^-$), it is possible to provide a cathode which does not include an electrolyte either around the cathode 30 or in the pores of the cathode 30. In some instances, an electrolyte may be provided in only a portion of the pores in the cathode as desired. The pore of the cathode 30 may be an empty space where a reaction product is formed and may also provide a path through which an oxygen-containing gas (e.g., air or oxygen) transports. For example, the empty space may be configured to receive a reaction product produced by the electrochemical reaction. The supply of the oxygen-containing gas to the cathode is improved when the pore is not filled with an electrolyte, or only a portion of the pore is filled with an electrolyte.

As the porosity of the cathode 30 increases, the reaction area of the metal-air battery also increases, and the increased porosity may be advantageous for increasing the capacity and improving the energy density of the metal-air battery. As used herein the term "porosity" is used to refer to a measure of the empty space (i.e., voids or pores) in a material and is determined as a percentage of the total volume of empty space in a material based on the total volume of the material.

The porosity of the cathode 30 may be, for example, about 90 volume percent (vol %) or less, or about 75 vol % or less, or about 50 vol % or less. The porosity thereof may be 0 vol % to about 90 vol %, or about 30 vol % to about 90 vol %, or about 50 vol % to about 80 vol %. As the specific surface area of the cathode 30 increases, the reaction area of the metal-air battery increases, which may be advantageous for capacity increase and energy density improvement. The specific surface area of the cathode 30 may be, for example, about 10 square meters per gram (m$^2$/g) or greater, or about 10 m$^2$/g to about 150 m$^2$/g, or about 20 m$^2$/g to about 100 m$^2$/g.

In FIG. 2, the configuration of the other components of the metal-air battery, other than the structure of the cathode 30, may be similar to those described with reference to FIG. 1. That is, the metal-air battery further includes an anode 10 including a metal, a separator 20 disposed between the anode 10 and the cathode 30, and a gas diffusion layer 40 disposed on the cathode 30. The material and function of the anode 10, the separator 20, and the gas diffusion layer 40 may be substantially the same as, or similar to, those described in FIG. 1, and thus a redundant description thereof will be omitted for conciseness.

The pore-containing structure of the cathode 30 illustrated in FIG. 2 is merely an example and may be variously modified. As an example, the pore-containing structure of the cathode 30 of FIG. 2 may be modified as illustrated in FIG. 3A. The cathode 30 of FIG. 3A may have a structure in which a plurality of first cathode layers 31 in the shape of thin plates are disposed spaced apart from each other and a second cathode layer 32 extends along the edges of the side surface of the first cathode layer 31. Also, as an example, the pore-containing structure of the cathode 30 of FIG. 2 may be modified as illustrated in FIG. 3B. The cathode 30 of FIG. 3B may have a structure in which a plurality of first cathode layers 31 in the shape of rods are disposed spaced apart from each other and a second cathode layer 32 is disposed on the outer surface of the first cathode layer 31 and surrounds the first cathode layer. In this case, a gas diffusion layer 40 may be disposed on the outer surface of the second cathode layer 32 and surrounds the second cathode layer. Also, as an example, the pore-containing structure of the cathode 30 of FIG. 2 may be modified as illustrated in FIG. 3C. The cathode 30 of FIG. 3C may have a structure in which a plurality of first cathode layers 31 in the shape of a rod having a hollow core 55 are disposed spaced apart from each other and a second cathode layer 32 is disposed on the inner surface of the first cathode layer and defines the side surface of the hollow within the first cathode layer 31. In FIGS. 2 to 3C, the pore-containing structure of the cathode 30 may be simplified as examples. An actual cathode may include more pores than illustrated herein and may be designed to have a more complex structure.

The metal-air battery according to an embodiment may include a cathode 30 including a first cathode layer 31 capable of providing a metal ion (e.g, Li$^+$) transfer path and a second cathode layer 32 capable of providing an electron (e$^-$) transfer path. In this regard, the metal-air battery of an embodiment may fundamentally prevent problems caused by electrolyte depletion and chemical deterioration which result from the use of an organic-based electrolyte. Thus, it may be advantageous for the performance improvement and life extension of the metal-air battery and may also be advantageous in terms of the manufacturing process and cost.

Figure 4:
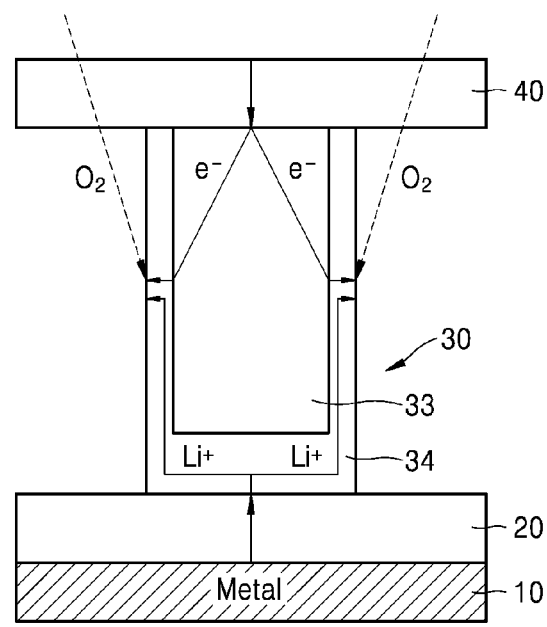
FIG. 4 is a cross-sectional view schematically illustrating an embodiment of a metal-air battery.

FIG. 4 is a cross-sectional view schematically illustrating a metal-air battery according to another embodiment.

The functions of the first cathode layer (e.g., a core portion) and the second cathode layer (e.g., a peripheral portion disposed to surround the core portion) are not limited to the path of metal ions (e.g, Li$^+$) and the electron (e$^-$) transfer path. The function of the core portion and the peripheral portion disposed to surround the core portion may vary according to a shape of the core portion and the peripheral portion and the materials included in the core portion and the peripheral portion.

Referring to FIG. 4, the metal-air battery may include an anode (anode layer) 10 including a metal and a cathode (cathode layer) 30 spaced apart from the anode 10. The cathode 30 may include a third cathode layer 33 and a fourth cathode layer 34 disposed on a portion of the third cathode layer 33. The third cathode layer may be configured as a core structure with the fourth cathode layer disposed on a surface of the core structure. A separator 20 may be disposed between the anode 10 and the cathode 30. The metal-air battery may further include a gas diffusion layer 40 in contact with a surface of the cathode 30.

In an embodiment, the third cathode layer includes the second conductive material and the fourth cathode layer includes the first conductive material. The second conductive material comprises lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, lithium zinc germanium oxide, lithium phosphorus oxynitride, or a combination thereof, and the first conductive material comprises lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, a reduced material thereof, or a combination thereof.

In an embodiment, the second conductive material may include lithium titanium oxide (LTO), lithium zinc germanium oxide (LISICON), lithium phosphorus oxynitride (LiPON), or a combination thereof, and the first compound conductive material may include reduced lithium titanium oxide (R-LTO), lithium lanthanum titanium oxide (LLTO), lithium cobalt oxide (LCO), lithium manganese oxide (LMO), or a combination thereof.

In FIG. 1, the first cathode layer 31 provides the metal ion (e.g, $Li^+$) transfer path and the second cathode layer 32 surrounding the first cathode layer 31 provides the electron ($e^-$) transfer path. However, referring to FIG. 4, the third cathode layer 33 may provide the electron (e−) transfer path and the fourth cathode layer 34 surrounding the third cathode layer 33 may provide the metal ion transfer path. As an example, the gas diffusion layer 40 may be disposed on a surface of the fourth cathode layer 34 which is not surrounded by the third cathode layer 33 and the separator 20 may be disposed on a surface of the third cathode layer 33.

As described above, the third cathode layer 33 may provide an electron transfer path, the fourth cathode layer 34 may provide a metal ion transfer path, the third cathode layer 33 may include a second conductive material, and the fourth cathode layer 34 may include a first conductive material. Accordingly, a third electron conductivity $\delta_{e3}$ of the third cathode layer 33 may be greater than a third cation conductivity $\delta_{ion3}$ of the third cathode layer 33 and a fourth cation conductivity $\delta_{ion4}$ of the fourth cathode layer 34 may be greater than a fourth electron conductivity $\delta_{e4}$ of the fourth cathode layer 34. Also, the third electron conductivity $\delta_{e3}$ may be greater than the fourth electron conductivity $\delta_{e4}$ and the fourth cation conductivity $\delta_{ion4}$ may be greater than the third cation conductivity $\delta_{ion3}$. As described above, by changing the shape of the third cathode layer 33 and the fourth cathode layer 34 and the materials included in the third cathode layer 33 and the fourth cathode layer 34, the third cathode layer 33 disposed as the core portion may provide the electron transfer path and the fourth cathode layer 34 surrounding the third cathode layer 33 may provide the metal ion transfer path.

Figure 5:
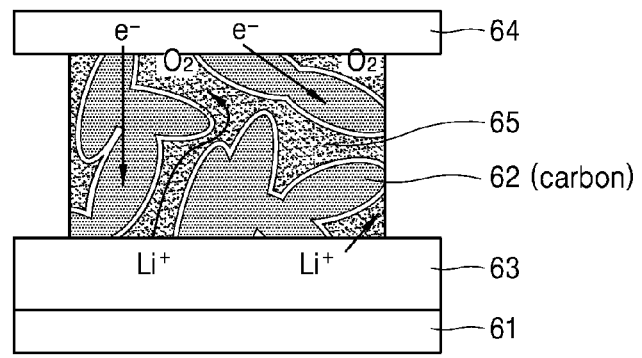
FIG. 5 is a cross-sectional view illustrating a metal-air battery according to Comparative Example 1.

FIG. 5 is a cross-sectional view illustrating a metal-air battery according to Comparative Example 1.

Referring to FIG. 5, a separator 63 may be provided on an anode 61 and a carbon-based porous cathode 62 may be provided between the separator 63 and a gas diffusion layer 64. An electrolyte 65 may be present within the pores of the cathode 62. The electrolyte 65 may be an organic-based electrolyte and may also be a liquid electrolyte. The porous cathode 62 may function as an electron conductor and the electrolyte 65 may function as an ion conductor. That is, electrons ($e^-$) may transfer through the porous cathode 62 and lithium ions ($Li^+$) may transfer through the electrolyte 65. At the carbon surface of the cathode 62, oxygen and lithium ions may react together with electrons to produce a lithium oxide. The pores of the cathode 62 may provide a space in which the lithium oxide as a reaction product is deposited.

However, since a lithium oxide (i.e., $Li_2O_2$) as a reaction product is highly reactive, and singlet oxygen and $O_2$ as intermediate products are very highly reactive, an organic-based electrolyte 65 may be chemically decomposed and rapidly deteriorate the battery. That is, the battery may be chemically deteriorated in the cathode portion due to the presence of the reaction product, the intermediate product, and the organic-based electrolyte 65. This may cause performance degradation and life shortening of the metal-air battery.

However, in the metal-air battery according to an embodiment, since the conductive material capable of conducting both electrons and ions is included in both the first cathode layer 31 and the second cathode layer 32, the organic-based electrolyte is not used or is only partially used, and thus the problem of chemical deterioration caused by the organic-based electrolyte may be fundamentally prevented or minimized. Thus, it may be very advantageous for the battery's performance improvement/maintenance and life extension. Also, when a separate electrolyte is not present in the cathode, the manufacturing process may be simplified, the manufacturing cost may be reduced, and various advantages may be obtained in terms of battery development and design.

Figure 6:
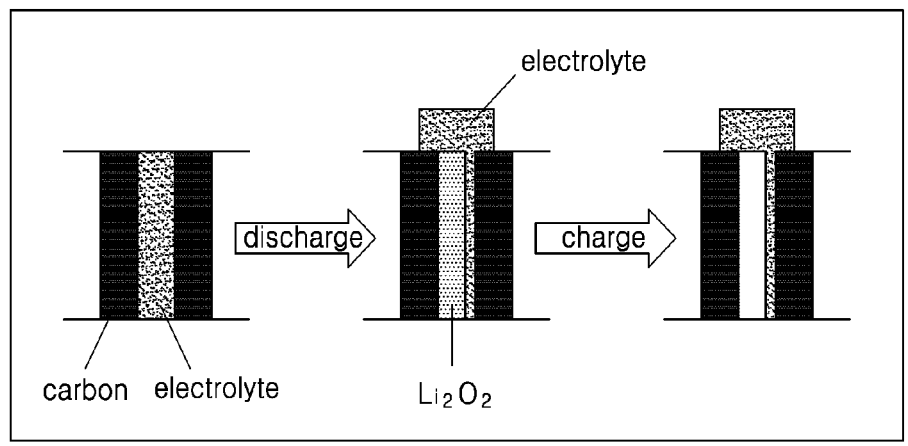
FIG. 6 is a diagram illustrating the process of electrolyte depletion in the metal-air battery according to Comparative Example 1.

FIG. 6 is a diagram illustrating the process of electrolyte depletion (squeeze-out) in the metal-air battery according to Comparative Example 1.

Referring to FIG. 6, an electrolyte is present within a pore of a carbon-based cathode, and when a reaction product ($Li_2O_2$) is formed in the pore in a discharge process (i.e., volume expansion), the electrolyte may be squeezed out (extruded) of the pore. Even when the reaction product ($Li_2O_2$) is removed through a charge process, a portion of the electrolyte extruded from inside of the pore to the outside the pore may not return into the pore. This may greatly degrade the battery performance. In particular, the electrolyte depletion problem may increase in the case of a full discharge.

Figure 7:
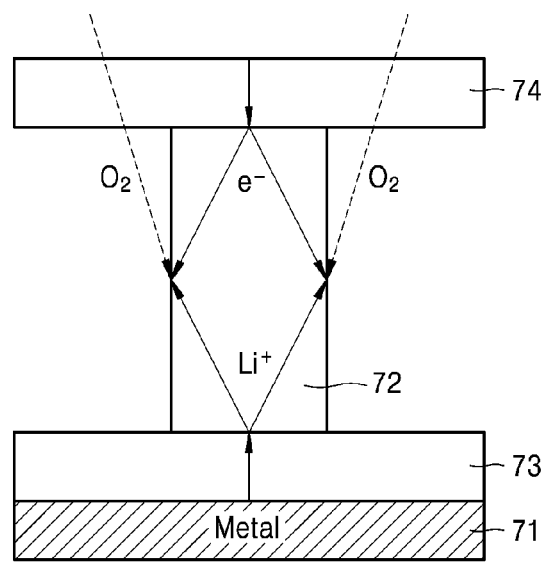
FIG. 7 is a cross-sectional view illustrating a metal-air battery according to Comparative Example 2.

FIG. 7 is a cross-sectional view illustrating a metal-air battery according to Comparative Example 2.

In FIG. 7, a separator 73 may be disposed on an anode 71, and a cathode 72 including a conductive material capable of both electron conduction and ion conduction may be disposed between the separator 73 and a gas diffusion layer 74. The cathode 72 may be an air electrode using oxygen ($O_2$) in the air as an active material. As described above, the cathode 72 may include a conductive material capable of both electron conduction and ion conduction. During an electrochemical reaction between the metal ions provided from the anode 71 and the gas (i.e., oxygen) provided to the cathode 72, the compound conductive material may provide an electron transfer paths and a metal ion transfer path.

In other words, the conductive material of the cathode 72 may have both a cathode function of providing an electron transfer path and an electrolyte function of providing an iron transfer path. However, since the cation conductivity and the electron conductivity of the conductive material included in the cathode 72 are inversely proportional to each other, it may be difficult to simultaneously provide both an electron transfer path and an ion transfer path.

However, in the metal-air battery according to an embodiment, since the first cathode layer 31 having the first cation conductivity $\delta_{ion1}$ greater than the first electron conductivity $\delta_{e1}$ is used to provide a metal ion transfer path and the second cathode layer 32 having the second electron conductivity $\delta_{e2}$ greater than the second cation conductivity $\delta_{ion2}$ is used to provide an electron transfer path, the metal ions (Li$^+$) and the electrons (e$^-$) may be more easily transferred. Thus, it may be very advantageous for the overall performance improvement/maintenance and life extension of the metal-air battery.

Figure 8A:
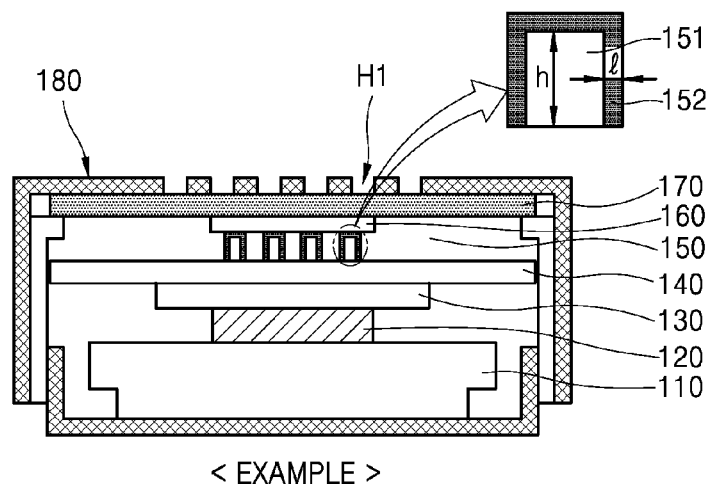
FIG. 8A is a cross-sectional view illustrating a configuration of a metal-air battery according to an Example.
Figure 8B:
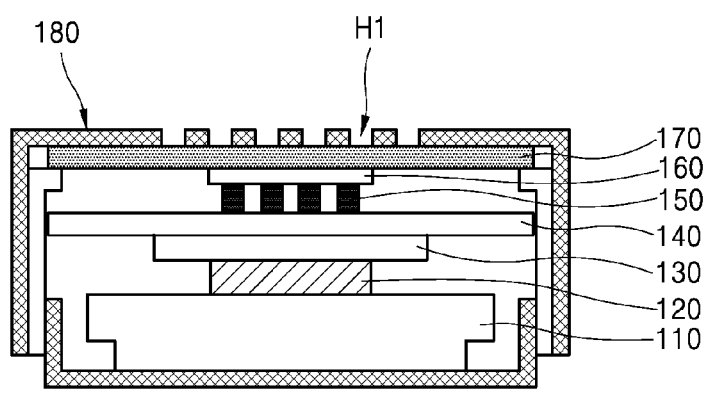
FIG. 8B is a cross-sectional view illustrating a configuration of a metal-air battery according to Comparative Example 2.

FIG. 8A is a cross-sectional view illustrating a configuration of a metal-air battery according to an example embodiment (Example). FIG. 8B is a cross-sectional view illustrating a configuration of a metal-air battery according to Comparative Example 2. The structures in FIGS. 8A and 8B are experimental structures for evaluating the performance of a metal-air battery.

Referring to FIGS. 8A and 8B, the metal-air battery according to the Example and Comparative Example 2 may have a coin cell shape. Battery components may be provided in a case 180 having a plurality of opening regions H1. A support structure 110 may be provided on a bottom surface of the case 180. The support structure 110 may include, for example, a spacer and a spring member (not shown). An anode 120 including a metal may be provided on the support structure 110. A reaction inhibiting layer 130 and a separator 140 may be sequentially provided on the anode 120. The reaction inhibiting layer 130 may be between the anode 120 and the separator 140 to inhibit/prevent a reaction therebetween. The reaction inhibiting layer 130 may have an ion conductive function.

In the Example, as illustrated in FIG. 8A, a cathode 150 may include, on the separator 140, a first cathode layer 151 configured to provide a transfer path of metal ions (Li$^+$) and a second cathode layer 152 configured to provide a transfer path of electrons (e$^-$). In Comparative Example 2, as illustrated in FIG. 8B, a cathode 150 may include a compound conductor material in a bulk shape on the separator 140.

The cathode 150 illustrated in the Example and Comparative Example 2 may have a structure including a plurality of pores. An electrically conductive material layer (hereinafter, referred to as "conductive layer") 160 may be disposed on the cathode 150 and a gas diffusion layer 170 may be disposed on the conductive layer 160. The gas diffusion layer 170 may be adjacent to the plurality of opening regions H1 to supply external air to the cathode 150.

As a specific example, the anode 120 may include lithium (Li) and the separator 140 may include lithium aluminum titanium phosphate (LATP) as a solid electrolyte. Herein, LATP may be Li$_{1+x}$Al$_x$Ti$_{2-x}$(PO$_4$)$_3$, where x is 0.3. Also, the separator 140 may further include tylosin (TYL) as an additive. The cathode 150 may include lithium cobalt oxide (LCO) as a conductive material. The conductive layer 160 may include gold (Au).

It was experimentally verified whether oxygen (O$_2$) in the atmosphere was reduced/oxidized at the surface of the cathode 150 with respect to the Example and Comparative Example 2 metal-air batteries described with reference to FIGS. 8A and 8B. For this purpose, evaluation of battery characteristics was performed in an oxygen (O$_2$) atmosphere and a nitrogen (N$_2$) atmosphere. Also, the cyclability of the metal-air battery was evaluated by repeating a charge/discharge test on the metal-air battery.

Figure 9:
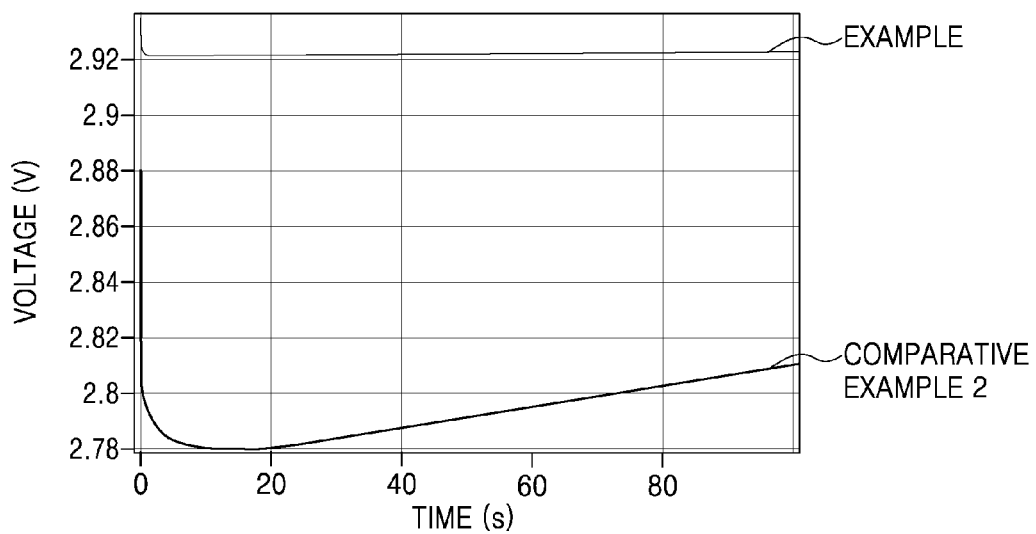
FIG. 9 is a graph of voltage (volts, V) versus time (second, s) obtained by simulation using a COMSOL® analysis program of Comparative Example 2 and of the Example.
Figure 10:
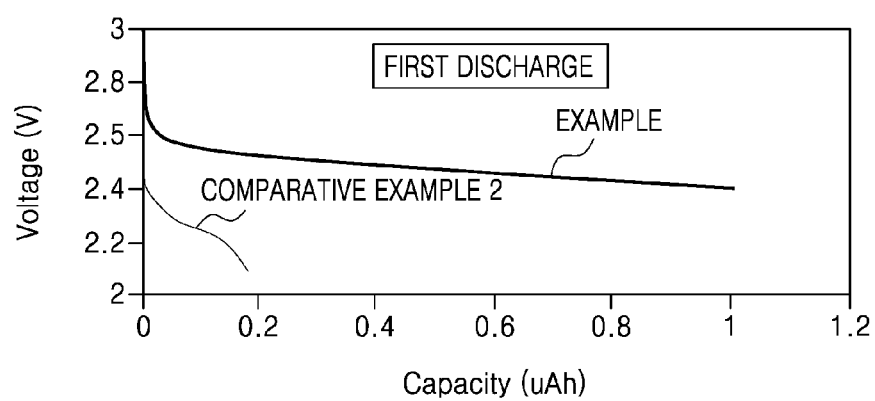
FIG. 10 is a graph of voltage (volts, V) versus discharge capacity (microampere-hours, µAh), obtained by simulation using a COMSOL® analysis of Comparative Example 2 and of the Example.
Figure 11:
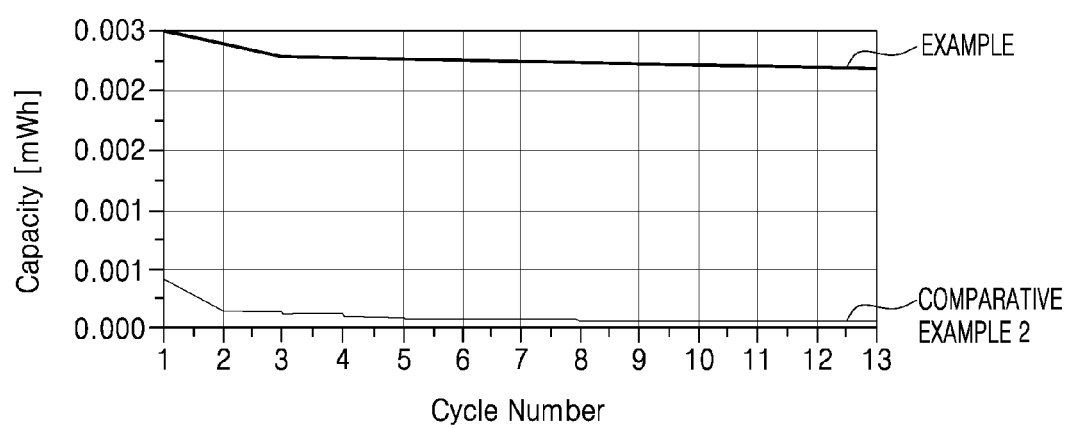
FIG. 11 is a graph of capacity (milliwatt-hours, mWh) versus cycle number, obtained by simulation using a COMSOL® analysis of Comparative Example 2 and of the Example.

FIGS. 9 to 11 are discharge graphs illustrating simulation results of electrochemical modules according to the Example and Comparative Example 2. In the discharge graphs of FIGS. 9 to 11 the data for Comparative Example 2 is obtained by simulation using a COMSOL® analysis program and assuming that a conductive material of LCO is used as a material of the cathode 150, and the data for the Example obtained from by simulation using a COMSOL® analysis program and assuming that a conductive material of LTO is used as a material of the first cathode layer 151 and a conductive material of RLTO is used as a material of the second cathode layer 152.

The metal-air battery according to the Example and Comparative Example 2 have an allowable overvoltage per current density as measured by Equation (1) below:

$$\eta/J = R_1(h) + R2(l) \qquad (1)$$

where "$\eta$" is an allowable overvoltage (in volts, V), "J" is a current density (mA/cm$^2$), "R$_1$" is an ionic resistance ($\Omega$) of the first cathode layer, "R$_2$" is an ionic resistance ($\Omega$) of the second cathode layer, "h" is a thickness (cm) of the first cathode layer, and "l" is a thickness (cm) of the second cathode layer.

In this case, the allowable overvoltage "$\eta$" of the metal-air battery according to the present embodiment may be greater than about 0 volts and less than or equal to about 1 volt, and the current density "J" thereof may be greater than or equal to about 0.2 mA/cm$^2$ and smaller than or equal to about 10 mA/cm$^2$.

As an example, as shown in Table 1 below, a cathode 150 in the shape of a bulk (e.g., see FIG. 8B) is provided in Comparative Example 2, and a cathode 150 including a first cathode layer 151 and a second cathode layer 152 (e.g., see FIG. 8A) may be provided in the Example.

TABLE 1

| | Example | Comparative Example 2 |
|---|---|---|
| Current Density (mA/cm$^2$) | 1 | 1 |
| Thickness of First Cathode Layer (cm) | 0.001 | — |
| Thickness of Second Cathode Layer (cm) | 0.000001 | — |
| Cathode Thickness (cm) | — | 0.001 |
| First Cathode Layer Cation Conductivity (S/cm) | 1.00E−03 | — |
| Second Cathode Layer Cation Conductivity (S/cm) | 1.00E−06 | — |
| Cathode Cation Conductivity (S/cm) | — | 1.00E−04 |
| First Cathode Layer Electron Conductivity (S/cm) | 1.00E−06 | — |
| Second Cathode Layer Electron Conductivity (S/cm) | 1.00E−03 | — |
| Cathode Electron Conductivity (S/cm) | — | 1.00E−06 |

As illustrated in FIGS. 8A to 11, compared to Comparative Example 2, where a bulk-shaped conductive material of LTO is used as a material of the cathode 150, in the Example where a conductive material of LTO is used as a material of the first cathode layer 151 and a conductive material of RLTO is used as a material of the second cathode layer 152, the overvoltage may be reduced and the charge/discharge reproducibility and cyclability may be improved. Without being limited by theory, it is believed that the overpotential effects (caused by the mass transport) and the resistances inside LTO and RLTO are very small. Thus, the cathode of the metal-air battery according to the embodiment, in which different conductive materials are utilized such that the first cathode layer 151 provides the metal ion transfer path and the second cathode layer 152 provides an electron transfer path, may be advantageous for performance improvement and life extension of the metal-air battery.

As described above, according to an embodiment of the present disclosure, a metal-air battery having excellent performance and excellent charge/discharge characteristics may be implemented. By reducing a voltage drop caused by overpotential, the overall performance of the metal-air battery may be improved and the life thereof may be extended. A metal-air battery capable of suppressing the problems caused by chemical deterioration and deformation due to charging/discharging may be implemented. A metal-air battery capable of preventing the problem caused by an organic-based electrolyte may also be implemented.

The metal-air battery according to the above embodiments includes a cathode including a plurality of cathode layers, which provide an electron conduction path and an ion conduction path. Accordingly, since a voltage drop caused by overpotential may be reduced, the cathode may be advantageous for the performance improvement and life extension of the battery. Also, since the problems caused by electrolyte depletion and chemical deterioration due to the presence of an organic-based electrolyte may be fundamentally prevented or reduced, the exemplary cathode may be advantageous in terms of minimizing the manufacturing process and reducing manufacturing cost. The metal-air battery may be applied as a power supply for various electronic devices such as electric vehicles. The metal-air batteries according to the present embodiments may be usefully applied to all fields in which secondary batteries are applied.

Although many details have been described above, they are not intended to limit the scope of the present disclosure, but should be interpreted as examples of the embodiments. For example, those of ordinary skill in the art may understand that the structure of the metal-air battery according to an embodiment may be variously modified. Therefore, the scope of the present disclosure should be defined not by the described embodiments but by the technical spirit and scope described in the following claims.

It should be understood that embodiments described herein should be considered in a descriptive sense only and not for purposes of limitation. Descriptions of features or aspects within each embodiment may be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A metal-air battery comprising:
an anode comprising a metal;
a cathode spaced apart from the anode; and
a separator between the anode and the cathode,
wherein the cathode comprises
a first cathode layer comprising a first conductive material, and
a second cathode layer disposed on the first cathode layer, the second cathode layer comprising a second conductive material, and
wherein the first conductive material and the second conductive material comprise same material including a lithium oxide, a sodium oxide, or a combination thereof, and
wherein a composition ration of the lithium oxide, the sodium oxide, or the combination thereof contained in the first conductive material and a composition ratio of the lithium oxide, the sodium oxide, or the combination thereof contained in the second conductive material are different.

2. The metal-air battery of claim 1, wherein the second cathode layer is on a portion of the first cathode layer.

3. The metal-air battery of claim 1, wherein:
a cation conductivity of the first cathode layer is greater than an electron conductivity of the first cathode layer,
an electron conductivity of the second cathode layer is greater than a cation conductivity of the second cathode layer,
the electron conductivity of the second cathode layer is greater than the electron conductivity of the first cathode layer, and
the cation conductivity of the first cathode layer is greater than the cation conductivity of the second cathode layer.

4. The metal-air battery of claim 1,
wherein the cathode satisfies equation 1:

$$0<R_1h+R_2l\leq5 \tag{1}$$

where $R_1$ is an ion resistance of the first cathode layer in ohms, $R_2$ is an ion resistance of the second cathode layer in ohms, h is a thickness of the first cathode layer in centimeters, and l is a thickness of the second cathode layer in centimeters.

5. The metal-air battery of claim 1, wherein the cathode comprises a pore-containing layer comprising a pore.

6. The metal-air battery of claim 5, wherein a porosity of the pore-containing layer is less than or equal to about 90 volume percent.

7. The metal-air battery of claim 5, wherein a specific surface area of the pore-containing layer is greater than or equal to about 10 square meters per gram.

8. The metal-air battery of claim 1, wherein the first conductive material comprises lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, lithium zinc germanium oxide, lithium phosphorus oxynitride, or a combination thereof, and
the second conductive material comprises lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, a reduced material thereof, or a combination thereof.

9. The metal-air battery of claim 1, wherein the first conductive material and the second conductive material independently comprise an inorganic material having a perovskite structure, an anti-perovskite structure, a layered structure, a spinel structure, a sodium super ionic conductor type structure, or a combination thereof.

10. The metal-air battery of claim 1, wherein the first conductive material and the second conductive material each comprise an inorganic solid compound.

11. The metal-air battery of claim 1, wherein the cathode comprises an organic electrolyte-free electrode.

12. The metal-air battery of claim 1, wherein the cathode comprises an empty space configured to receive a reaction product produced by the electrochemical reaction, and the empty space comprises an electrolyte-free region.

13. The metal-air battery of claim 1, further comprising a gas diffusion layer disposed on a surface of the second cathode layer.

14. The metal-air battery of claim 1, wherein the separator comprises a solid electrolyte.

15. The metal-air battery of claim 1, wherein:
- an electron conductivity of the first cathode layer is greater than a cation conductivity of the first cathode layer,
- a cation conductivity of the second cathode layer is greater than an electron conductivity of the second cathode layer,
- the electron conductivity of the first cathode layer is greater than the electron conductivity of the second cathode layer, and
- the cation conductivity of the second cathode layer is greater than the cation conductivity of the first cathode layer.

16. The metal-air battery of claim 15, wherein the cathode comprises a pore-containing layer comprising a pore.

17. The metal-air battery of claim 16, wherein a porosity of the pore-containing layer is less than or equal to about 90 volume percent.

18. The metal-air battery of claim 16, wherein a specific surface area of the pore-containing layer is greater than or equal to about 10 square meters per gram.

19. The metal-air battery of claim 15, wherein the first conductive material comprises a lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, lithium zinc germanium oxide, lithium phosphorus oxynitride, or a combination thereof, and
the second conductive material comprises lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, a reduced material thereof, or a combination thereof.

20. The metal-air battery of claim 15, wherein the cathode comprises an organic electrolyte-free electrode.

21. The metal-air battery of claim 15, wherein the cathode comprises an empty space configured to receive a reaction product produced by the electrochemical reaction, and the empty space comprises an electrolyte-free region.

22. The metal-air battery of claim 15, further comprising a gas diffusion layer disposed on a surface of the third cathode layer.

23. The metal-air battery of claim 15, wherein the separator comprises a solid electrolyte.

* * * * *

UNITED STATES PATENT AND TRADEMARK OFFICE
CERTIFICATE OF CORRECTION

PATENT NO.        : 11,258,122 B2
APPLICATION NO.   : 16/544981
DATED             : February 22, 2022
INVENTOR(S)       : Heungchan Lee et al.

Page 1 of 1

It is certified that error appears in the above-identified patent and that said Letters Patent is hereby corrected as shown below:

In the Claims

In Column 16, Line 1, in Claim 1, please delete "ration" and replace with -- ratio --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*